(12) United States Patent
Yasuda

(10) Patent No.: US 8,339,638 B2
(45) Date of Patent: Dec. 25, 2012

(54) IMAGE PROCESSING APPARATUS, IMAGE READING APPARATUS, AND IMAGE PROCESSING SYSTEM

(75) Inventor: Naohiro Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1127 days.

(21) Appl. No.: 12/213,943

(22) Filed: Jun. 26, 2008

(65) Prior Publication Data

US 2009/0002778 A1   Jan. 1, 2009

(30) Foreign Application Priority Data

Jun. 29, 2007 (JP) ................................. 2007-173166
Apr. 22, 2008 (JP) ................................. 2008-111259

(51) Int. Cl.
*G06F 3/12* (2006.01)
*H04N 1/40* (2006.01)
*H04N 1/04* (2006.01)
*H04N 1/00* (2006.01)
*H04N 1/46* (2006.01)

(52) U.S. Cl. ..... 358/1.15; 358/3.24; 358/474; 358/3.28; 358/426.06; 358/539

(58) Field of Classification Search ........................ None
See application file for complete search history.

(56) References Cited

U.S. PATENT DOCUMENTS

| 6,891,634 | B1 * | 5/2005 | Nihei ........................... 358/1.15 |
| 7,016,071 | B1 * | 3/2006 | Hiraishi et al. ................. 358/1.6 |
| 7,362,418 | B2 | 4/2008 | Yasuda |
| 2002/0089707 | A1 | 7/2002 | Yasuda |
| 2005/0084170 | A1 | 4/2005 | Yasuda |
| 2006/0291002 | A1 | 12/2006 | Obata |
| 2007/0030532 | A1 | 2/2007 | Fujioka et al. |
| 2007/0285731 | A1 | 12/2007 | Yasuda |

FOREIGN PATENT DOCUMENTS

| JP | 07-123249 | 5/1995 |
| JP | 11-259267 | 9/1999 |
| JP | 2000-338833 | 12/2000 |
| JP | 2002-374409 | 12/2002 |
| JP | 3602581 | 10/2004 |
| JP | 2006-333015 | 12/2006 |

OTHER PUBLICATIONS

European Office Action.
Chinese Office Action Issued Jan. 15, 2010.
Abstract of JP 08-139906 published May 31, 1996.

* cited by examiner

*Primary Examiner* — Thomas Lett
(74) *Attorney, Agent, or Firm* — Harness, Dickey & Pierce, P.L.C.

(57) ABSTRACT

An image reading apparatus scans an original and generates image data of the original, sequentially transmits the image data while scanning the original, detects a predetermined particular image from the image data, and transmits a detection result of detecting the particular image. An image processing apparatus receives the image data and the detection result from the image reading apparatus, stores the image data in a storage unit, determines whether the detection result is received, and when it is determined that the detection result is received, restricts usage of the image data stored in the storage unit.

19 Claims, 11 Drawing Sheets

IMAGE PROCESSING APPARATUS, IMAGE READING APPARATUS, AND IMAGE PROCESSING SYSTEM

CROSS-REFERENCE TO RELATED APPLICATIONS

The present application claims priority to and incorporates by reference the entire contents of Japanese priority documents 2007-173166 filed in Japan on Jun. 29, 2007 and 2008-111259 filed in Japan on Apr. 22, 2008.

BACKGROUND OF THE INVENTION

1. Field of the Invention

The present invention relates to an image processing apparatus, an image reading apparatus, and an image processing system that restricts, when the image reading apparatus reads a copy-prohibited document, usage of the copy-prohibited document.

2. Description of the Related Art

There have been used multifunction peripherals (MFPs) having various functions such as a scanner that scans an original image, a copy machine that prints the original image obtained by the scanner, and a printer or a facsimile that prints image data received from an external device.

Some of the MFPs supports, for example, tool without an interesting name (TWAIN). In response to a command from an external device such as a personal computer (PC), the MFPs scan the image data, and process the obtained image data so that the external device can load the processed image data. Some of such MFPs transmit the obtained image data sequentially to the external device while scanning the image data because of limitation of a storage capacity, without storing the entire image data representing one page.

For example, if an original in A4 size is scanned at 600 dpi, a volume of the image data to be transmitted can be about 100 megabytes in an uncompressed state. In other words, the MFP that does not transmit the image data until the entire image data representing one page is stored is required to include a memory with a capacity of 100 MB or larger. However, such MFPs including a large-capacity memory will cost higher. To reduce the production cost by using a low-capacity memory, some of the MFPs transmit the obtained image data sequentially.

Moreover, if the MFP stores the entire image data representing one page and then transmits the stored image data, it takes longer time to transmit the entire image data, because the MFP cannot start data transmission until the entire image data is stored. Therefore, the MFP that sequentially transmits the stored image data while storing the obtained image data has an advantage in shortening the total transmission period.

There has been developed MFPs having a copy-prohibited document detecting function for determining whether the obtained image data represents a copy-prohibited document such as bills or securities. When the copy-prohibited document is detected, the MFPs delete or break the image data, or stop image-data transmission.

Japanese Patent Application Laid-open No. 2002-374409, for example, discloses a technology about a data transmitting apparatus that includes a data processing device including a storage unit and a filing device. When the data processing device determines that the image data represents the copy-prohibited document, the data transmitting device deletes the image data from the storage unit and transmits predetermined dummy image data instead of the image data to the filing device.

Japanese Patent Application Laid-open No. 2006-333015 discloses an image forming apparatus that processes, when it is determined that the image data represents the copy-prohibited document, the image data and notifies the user of a result of determination. With this configuration, it is possible to watch for image processing and prevent illegal image processing, without driving the user confused.

As described above, the data transmitting apparatus disclosed in Japanese Patent Application Laid-open No. 2002-374409 or the image forming apparatus disclosed in Japanese Patent Application Laid-open No. 2006-333015 deletes the image data stored therein, or transmits to the external device the dummy image data instead of the image data. In other words, if the obtained image data is transmitted sequentially to the external device, a part of the image data that the external device has received already remains unmasked, so that a malicious user can illegally obtain a part of the copy-prohibited image data.

The above problem arises because a certain volume of image data is required to detect the copy-prohibited document. For example, if the copy-prohibited document is detected by comparing a portion of the original with image patterns of parts of the copy-prohibited document, it is necessary to read a certain volume of image data enough for comparing the image pattern. In other words, the certain volume of image data has already been transmitted to the external device when the copy-prohibited document is detected using the above method.

Making use of this mechanism, the malicious user can forge the copy-prohibited document by, for example, combining parts of the image data that the external device has already received. It is difficult for the conventional technologies to prevent illegal usage of the image data.

SUMMARY OF THE INVENTION

It is an object of the present invention to at least partially solve the problems in the conventional technology.

According to an aspect of the present invention, there is provided an image processing system including an image reading apparatus that reads an original and outputs image data of the original; and an image processing apparatus that is connected to the image reading apparatus, and processes image data input from the image reading apparatus. The image reading apparatus includes a scanner unit that scans the original and generates the image data, a first transmitting unit that sequentially transmits the image data generated by the scanner unit while the scanner unit scans the original, a detecting unit that detects a predetermined particular image from the image data, and a second transmitting unit that transmits a detection result of detecting the particular image. The image processing apparatus includes a receiving unit that receives the image data and the detection result from the image reading apparatus, a storing unit that stores the image data received by the receiving unit in a storage unit, a determining unit that determines whether the detection result is received, and a restricting unit that restricts, when the determining unit determines that the detection result is received, usage of the image data stored in the storage unit.

Furthermore, according to another aspect of the present invention, there is provided an image reading apparatus that reads an original and outputs image data of the original, which is configured to be connected to an image processing apparatus that processes image data input from the image reading apparatus. The image reading apparatus includes a scanner unit that scans the original and generates the image data; a first transmitting unit that sequentially transmits the image data generated by the scanner unit while the scanner unit scans the original; a detecting unit that detects a predetermined particular image from the image data; and a second transmitting unit that transmits a detection result of detecting the particular image.

Moreover, according to still another aspect of the present invention, there is provided an image processing apparatus that is configured to be connected to an image reading apparatus that reads an original and outputs image data of the original. The image processing apparatus processes image data input from the image reading apparatus, and includes a receiving unit that receives the image data and a detection result of detecting a particular image in the image data from the image reading apparatus; a storing unit that stores the image data received by the receiving unit in a storage unit; a determining unit that determines whether the detection result is received; and a restricting unit that restricts, when the determining unit determines that the detection result is received, usage of the image data stored in the storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

In an image processing system according to a first embodiment of the present invention, an image reading apparatus sequentially transmits, while reading image data, obtained image data to an external device such as a PC. The image reading apparatus also transmits a flag indicative of a result of determination whether a copy-prohibited document has been detected. The external device receives the image data and the flag, and processes the received image data based on the flag.

Figure 1:
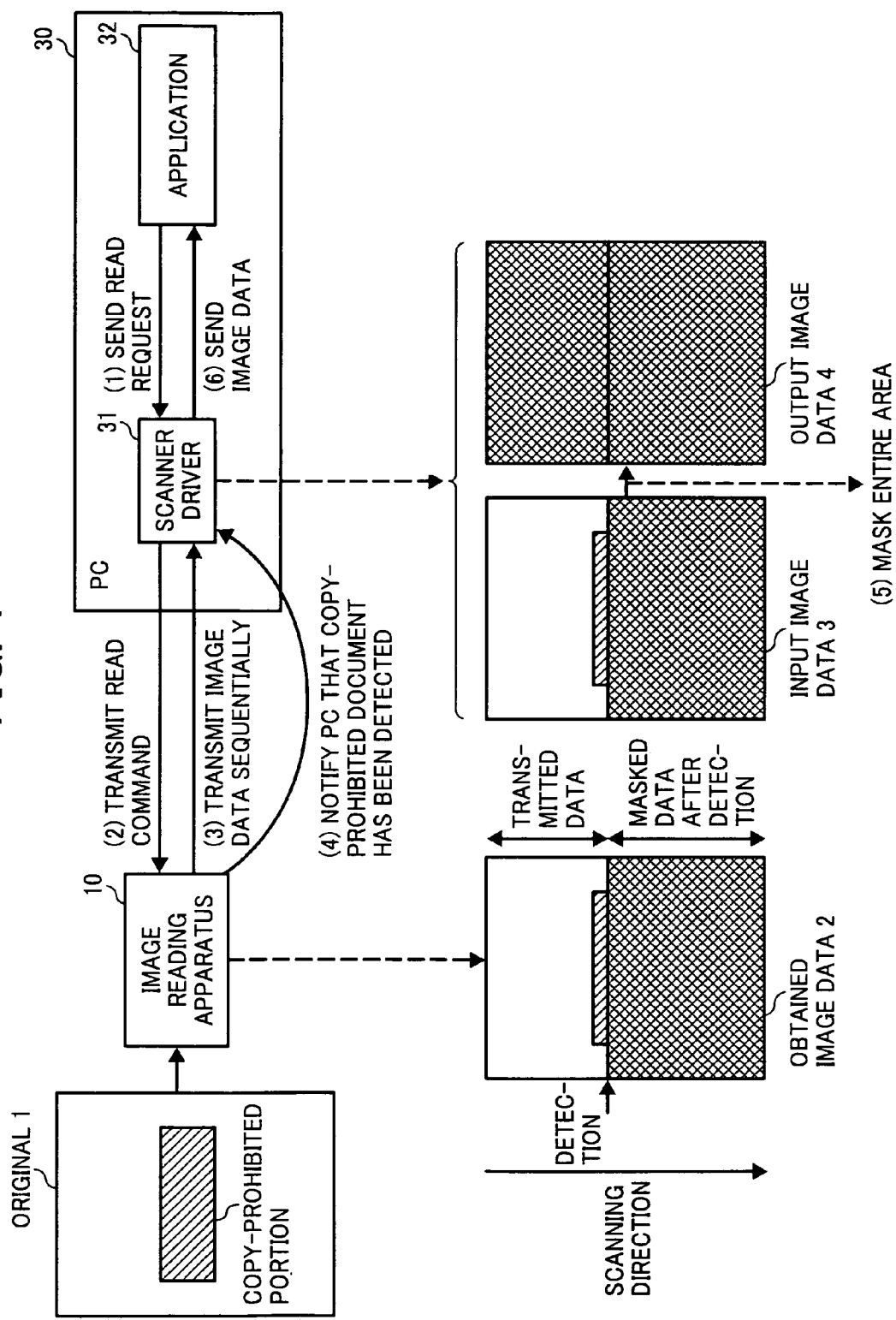
FIG. 1 is a schematic diagram for explaining an outline of an image process according to a first embodiment of the present invention.

Given below is an explanation about an image process performed by the image processing system according to the first embodiment with reference to FIG. 1. FIG. 1 is a schematic diagram for explaining an outline of the image process. The image processing system includes an image reading apparatus 10 such as an MFP that has at least a scanner function of reading image data from an original, and a PC 30 working as an image processing apparatus. The image reading apparatus 10 reads the original in response to a read command received from an application 32 of the PC 30.

When the application 32 sends a read request (see, (1)), a scanner driver 31 transmits a read command to the image reading apparatus 10 (see, (2)). The image reading apparatus 10 reads image data from the original in response to the read command, and sequentially transmits the obtained image data to the PC 30 while reading the image data (see, (3)).

It is assumed that an original 1 including a copy-prohibited portion is to be scanned. The image reading apparatus 10, while reading the original 1, detects that the original 1 includes the copy-prohibited document by sequentially comparing obtained pieces of image data (hereinafter, "before-detection data") with patterns of the copy-prohibited document. The image reading apparatus 10 masks pieces of image data that the image reading apparatus 10 obtains after detection of the copy-prohibited document (hereinafter, "after-detection data") by, for example, replacing the after-detection data with white image. Obtained image data 2 shown in FIG. 1 is an example that is obtained as a result of the mask treatment.

When the copy-prohibited document is detected, the image reading apparatus 10 notifies the PC 30 that the copy-prohibited document has been detected (see, (4)). Input image data 3 shown in FIG. 1 explains a state of the image data stored in the PC 30 before the notification. Because the PC 30 receives the image data sequentially, a former part of the input image data 3 that the PC 30 has already received before the detection remains unmasked. The scanner driver 31 masks entire area of the image data stored in the PC 30 (see, (5)), and sends the masked image data as output image data 4 to the application 32 (see, (6)).

In this manner, the application 32 receives the masked image data, which prevents illegal usage of the copy-prohibited image.

As described above, if the image reading apparatus 10 replaces the after-detection data with dummy data, the external device cannot receive the entire copy-prohibited image even in a situation that the external device receives the image data sequentially from the image reading apparatus 10. However, there is possibility that a malicious user obtains information about the copy-prohibited document detecting process such as an area required for detecting the copy-prohibited document by analyzing the input image data 3. The image processing system according to the present embodiment, in contrast, can avoid the possibility by masking the before-detection data stored in the PC 30.

Figure 2:
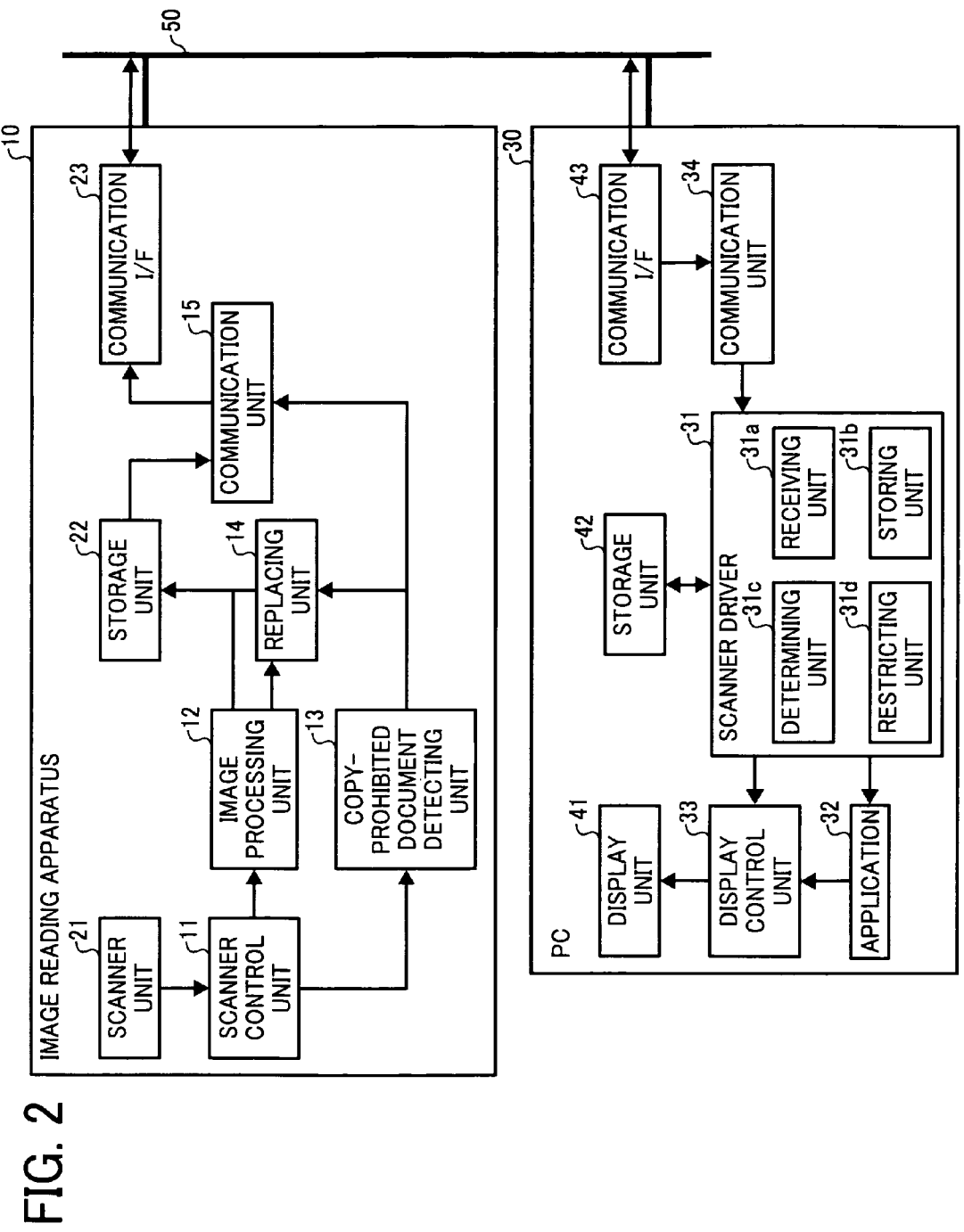
FIG. 2 is a block diagram of an image processing system according to the first embodiment.

Given below is an explanation about the structure of the image processing system according to the first embodiment with reference to FIG. 2. FIG. 2 is a block diagram of the image processing system. The image processing system includes the image reading apparatus 10 and the PC 30 that are connected to each other via a network 50 such as a local area network (LAN).

Alternatively, any network configuration such as the Internet can be used as the network 50 instead of the network 50. Moreover, the image reading apparatus 10 can be connected to the PC 30 by using any methods including via wire communication interfaces such as a universal serial bus (USB) or an IEEE 1394 or via wireless communication interfaces without using the network 50.

The image reading apparatus 10 includes a scanner unit 21, a storage unit 22, and a communication interface (I/F) 23, as hardware. The image reading apparatus 10 includes a scanner control unit 11, an image processing unit 12, a copy-prohibited document detecting unit 13, a replacing unit 14, and a communication unit 15, as software.

The scanner unit 21 optically scans the original, and creates the image data from the original. More particularly, to read the image data from the original, the scanner unit 21 emits a scanning light onto the original while the original is moving in the sub-scanning direction, and converts a light reflected from the original by a photoelectric converter such as a charge coupled device (CCD).

The storage unit 22 stores therein the image data obtained by the scanner unit 21. The storage unit 22 temporarily stores the image data to absorb a gap between a scanning speed of the scanner unit 21 and a transmission speed of the communication I/F 23. It means that the storage unit 22 is not required to store the entire image data representing one page. In other words, pieces of image data corresponding to a part of the original are stored in the storage unit 22. After that, the pieces of image data stored in the storage unit 22 are transmitted to the PC 30 sequentially.

The communication I/F 23 is used to transmit/receive the image data or the like to/from the external device including the PC 30 via the network 50.

The scanner control unit 11 controls reading operations of the scanner unit 21.

The image processing unit 12 performs various image processings including correcting distortion of the image data obtained by the scanner unit 21 and filtering the image data.

The copy-prohibited document detecting unit 13 detects the copy-prohibited document such as bills or securities in the image data obtained by the scanner unit 21. As the copy-prohibited document detecting process, for example, the copy-prohibited document detecting unit 13 extracts a feature image from the image data, and compares the extracted feature image with predetermined image patterns of the copy-prohibited document. If a degree of similarity between the extracted feature image and the image pattern of the copy-prohibited document is higher than a threshold, the copy-prohibited document detecting unit 13 determines that the image data represents the copy-prohibited document. It is allowable any generally-used methods for the copy-prohibited document detecting process.

The replacing unit 14 replaces, if the copy-prohibited document is detected, the image data with a predetermined mask image. More particularly, the replacing unit 14 replaces the after-detection data with the mask image that is, for example, made up of white pixels or black pixels only. In this manner, when the image reading apparatus 10 that is to transmit the image data in an uncompressed state reads the copy-prohibited document, the image reading apparatus 10 masks the latter part of the image data.

The communication unit 15 transmits/receives the image data or the like to/from the PC 30 via the communication I/F 23. For example, the communication unit 15 transmits to the PC 30 the image data and data indicative whether the copy-prohibited document detecting unit 13 has detected the copy-prohibited document (hereinafter, "result of detection") in a form of a flag.

When a total amount of pieces of the image data stored in the storage unit 22 reaches a predetermined value (size), the communication unit 15 transmits the pieces to the PC 30. For example, when pieces of the image data occupy a predetermined area of the storage unit 22 for storing the image data, i.e., when a volume of the pieces reaches a capacity of the predetermined area, the communication unit 15 transmits the pieces to the PC 30. Any other manners can be used to transmit the generated image data sequentially while scanning the original.

Given below is an explanation about the structure of the PC 30. As shown in FIG. 2, the PC 30 includes a display unit 41, a storage unit 42, and a communication I/F 43 as hardware. The PC 30 includes the scanner driver 31, the application 32, a display control unit 33, and a communication unit 34 as software.

The display unit 41 displays the image data or the like that is received from the image reading apparatus 10.

The storage unit 42 stores therein the received image data. The storage unit 42 has a storage capacity enough for storing at least the image data corresponding to one frame (i.e., one page, typically). After the image data forming one frame has stored in the storage unit 42, the PC 30 acquires the image data from the storage unit 42 and displays the acquired image data on the display unit 41.

Any type of generally-used storage medium such as a hard disk device (HDD), an optical disc, or a memory card can be used as the storage unit 42 and the storage unit 22.

The communication I/F 43 transmits/receives the image data or the like to/from the image reading apparatus 10 via the network 50.

The scanner driver 31 is used as software for the PC 30 to control operations of the image reading apparatus 10. The application 32, using the scanner driver 31, controls the image reading apparatus 10, e.g., causes the image reading apparatus 10 to read the original. The scanner driver 31 includes a receiving unit 31*a*, a storing unit 31*b*, a determining unit 31*c*, and a restricting unit 31*d*.

The receiving unit 31*a* receives the image data from the image reading apparatus 10 via the communication unit 34. The receiving unit 31*a* also receives from the image reading apparatus 10 the result of detection. The storing unit 31*b* stores the received image data in the storage unit 42.

The determining unit 31*c* determines whether the receiving unit 31*a* has received the result of detection normally. If the receiving unit 31*a* has received the result of detection normally, the determining unit 31*c* further determines whether the copy-prohibited document has been detected from the result of detection.

When the determining unit 31*c* determines that the copy-prohibited document has been detected, the restricting unit 31*d* restricts usage of the received image data. The restricting unit 31*d* replaces the entire image data stored in the storage unit 42 with the mask image so that the user cannot use the copy-prohibited image.

When the determining unit 31*c* determines that the receiving unit 31*a* has not received the result of detection normally, the restricting unit 31*d* restricts usage of the received image data. With this configuration, even if communications between the image reading apparatus 10 and the PC 30 is cut off during the PC 30 being receiving the image data by, for example, pulling out the network cable, the malicious user cannot illegally obtain the copy-prohibited image data.

The scanner driver 31 controls the image reading apparatus 10 via the communication I/F 43. Moreover, it is possible to add a unique specification to the scanner driver 31 depending on specifications of the image reading apparatus 10. In the present embodiment, it is possible to prevent illegal usage of the copy-prohibited document by using the scanner driver 31 added with the unique function of restricting usage of the copy-prohibited document working in cooperated with the image reading apparatus 10. In this manner, because the scanner driver 31 supports the required function, it is unnecessary to add an additional function working with the image reading apparatus 10 to the application 32.

The application 32 is image-processing software that operates on a generally-used operation system (not shown). The application 32 has a pull-based scanning function in which a read command is transmitted to the image reading apparatus 10 via the scanner driver 31, and the image data in response to the read command is received from the image reading apparatus 10. The scanner driver 31 is in charge of former control for storing the image data in the storage unit 42, while the application 32 is in charge of later control for displaying the image data stored in the storage unit 42 on the display unit 41. In other words, control over the image data is transferred from the scanner driver 31 to the application 32 when the image data is stored in the storage unit 42.

The display control unit 33 controls various display processes including an image-data display process of displaying the image data on the display unit 41. The communication unit 34 receives the image data and the result of detection from the image reading apparatus 10 via the communication I/F 43.

Figure 3:
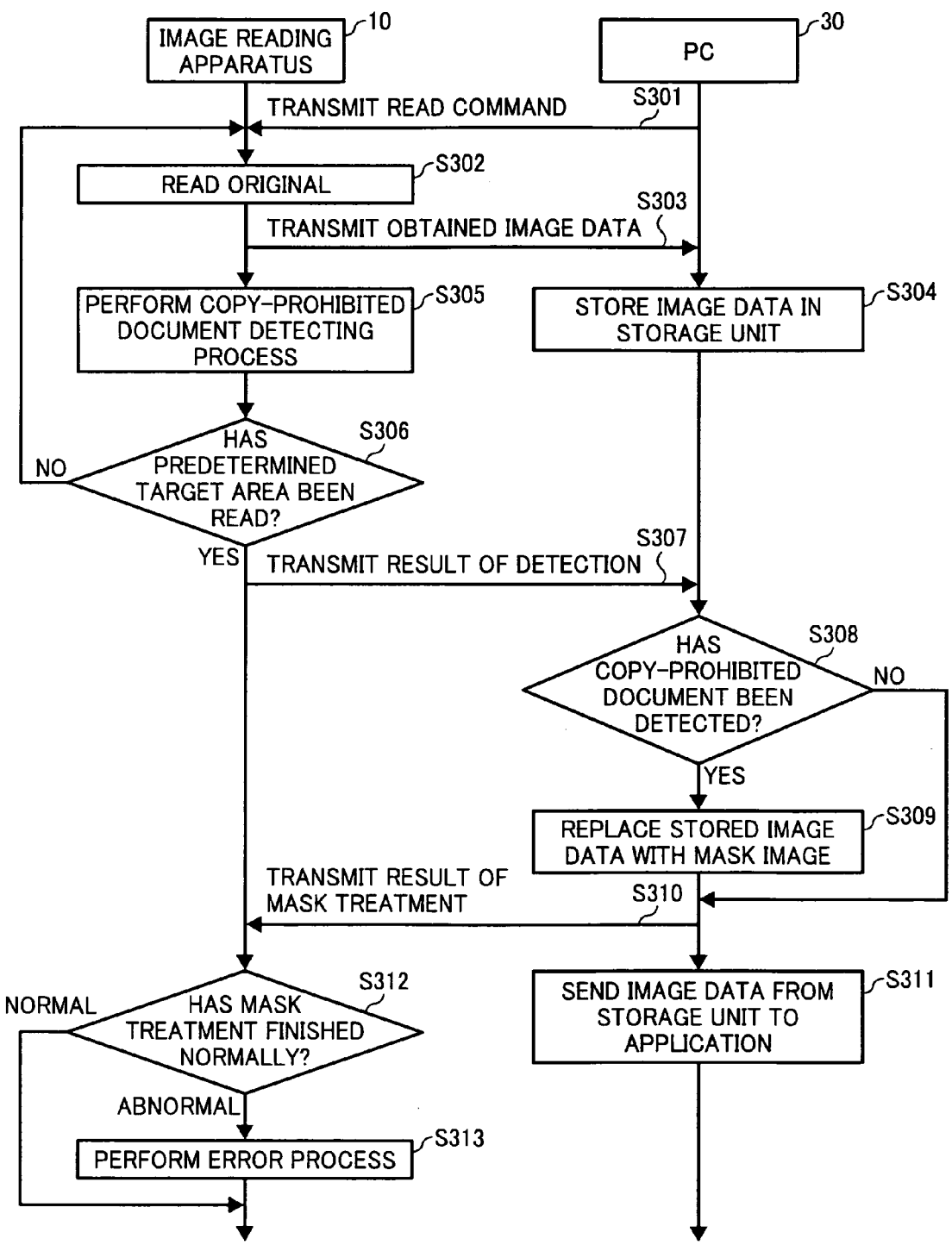
FIG. 3 is a sequence diagram of the image process performed by the image processing system shown in FIG. 2.

Given below is an explanation about the image process performed by the image processing system according to the first embodiment with reference to FIG. 3. FIG. 3 is a sequence diagram for explaining an outline of the image process.

The application 32 transmits a read command to the image reading apparatus 10 via the scanner driver 31 to request the image reading apparatus 10 to read the original (Step S301).

In the image reading apparatus 10, the scanner control unit 11 causes the scanner unit 21 to read the image data in response to the read command (Step S302). The communication unit 15 sequentially transmits the obtained image data to the PC 30 (Step S303).

In the PC 30, the receiving unit 31a receives the image data via the communication unit 34 from the image reading apparatus 10, and the storing unit 31b stores the received image data in the storage unit 42 (Step S304).

In the image reading apparatus 10, the copy-prohibited document detecting unit 13 performs the copy-prohibited document detecting process to detect the copy-prohibited document from the obtained image data (Step S305). The scanner control unit 11 determines whether the scanner unit 21 has read a predetermined target area of the original (hereinafter, "frame" as appropriately). The target area is an area to be read and specified by the user (Step S306). In most cases, one frame indicates entire area (one page) of the original. If, for example, the user specifies a plurality of areas to be read from among a single-page original, the image reading apparatus 10 reads a plurality of frames from among the single-page original.

When the predetermined target area has not been read (No at Step S306), the scanner unit 21 goes on reading (Step S302). When the predetermined target area has been read (Yes at Step S306), the communication unit 15 transmits a result of detection to the PC 30 (Step S307).

In the PC 30, the determining unit 31c determines whether the copy-prohibited document has been detected from the result of detection (Step S308). When the determining unit 31c determines that the copy-prohibited document has been detected (Yes at Step S308), the restricting unit 31d replaces the image data stored in the storage unit 42 with the mask image (Step S309). After that, the communication unit 34 transmits a result of mask treatment, which indicates whether the mask treatment has been performed normally, to the image reading apparatus 10 (Step S310). The scanner driver 31 sends the masked image data to the application 32 that has requested reading of the original (Step S311).

In the image reading apparatus 10, the scanner control unit 11 receives the result of mask treatment via the communication unit 15, and determines whether the mask treatment has finished normally from the result of mask treatment (Step S312). When the scanner control unit 11 determines that the mask treatment has finished normally (Normal at Step S312), the scanner control unit 11 finishes the image reading process. Although not shown in the sequence diagram, if the user has requested next reading operation, the image processing system processes the next original in the similar manner by repeating the above image process.

When the scanner control unit 11 determines that the mask treatment has finished abnormally (Abnormal at Step S312), the scanner control unit 11 performs an error process, for example, stops reading of the original (Step S313). Thus, the process control at the image reading apparatus 10 goes to end.

Figure 4:
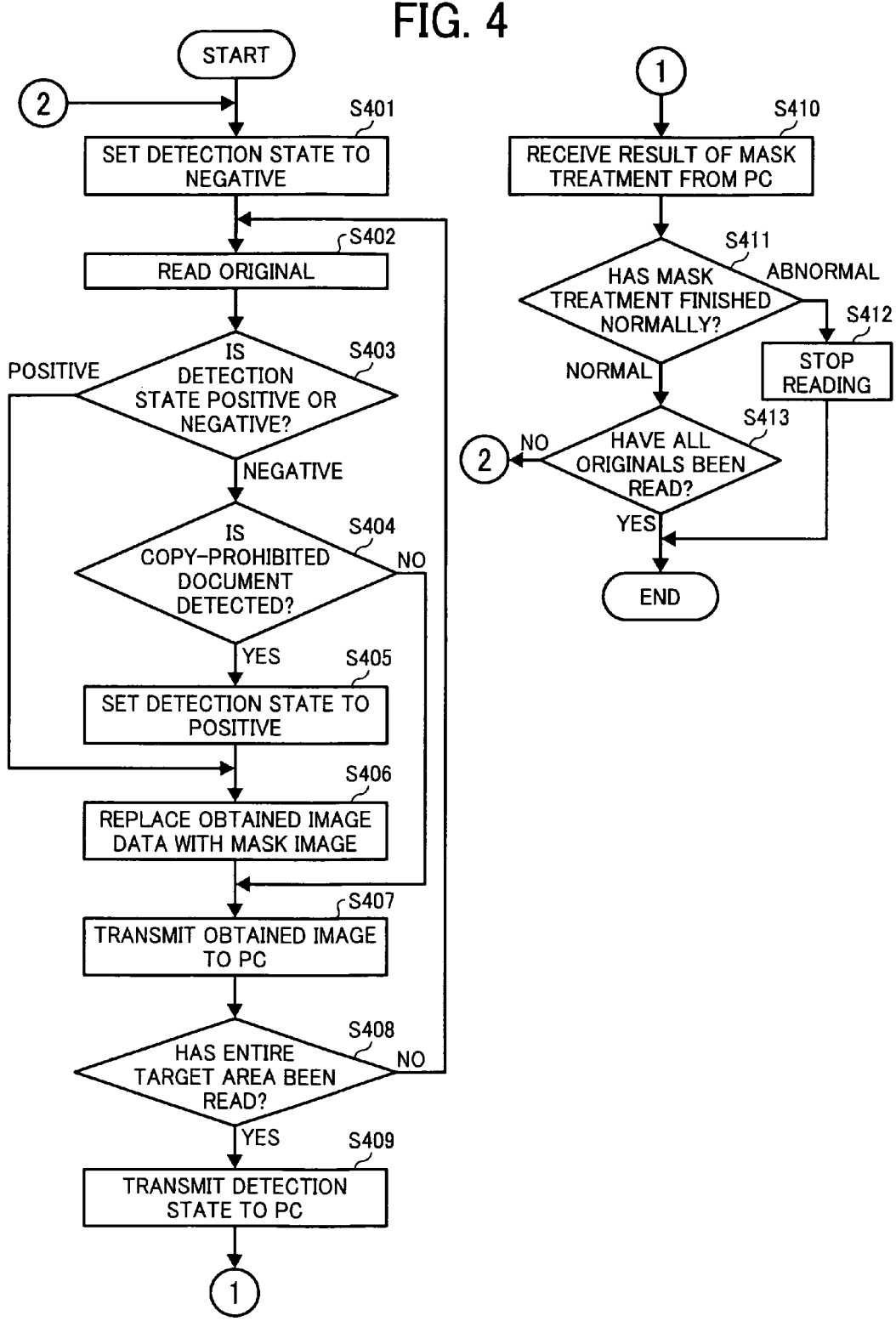
FIG. 4 is a flowchart of an image reading process according to the first embodiment.

The image process shown in FIG. 3 is described in detail with reference to FIGS. 4 and 5. FIG. 4 is a flowchart of an image reading process in which the image reading apparatus 10 reads the image data and transmits the obtained image data to the PC 30. The image reading process follows sending the read request from the application 32 (see, (1) of FIG. 1) and transmitting the read command from the scanner driver 31 (see, (2) of FIG. 1), and includes the steps indicated by (3) and (4) shown in FIG. 1.

Figure 5:
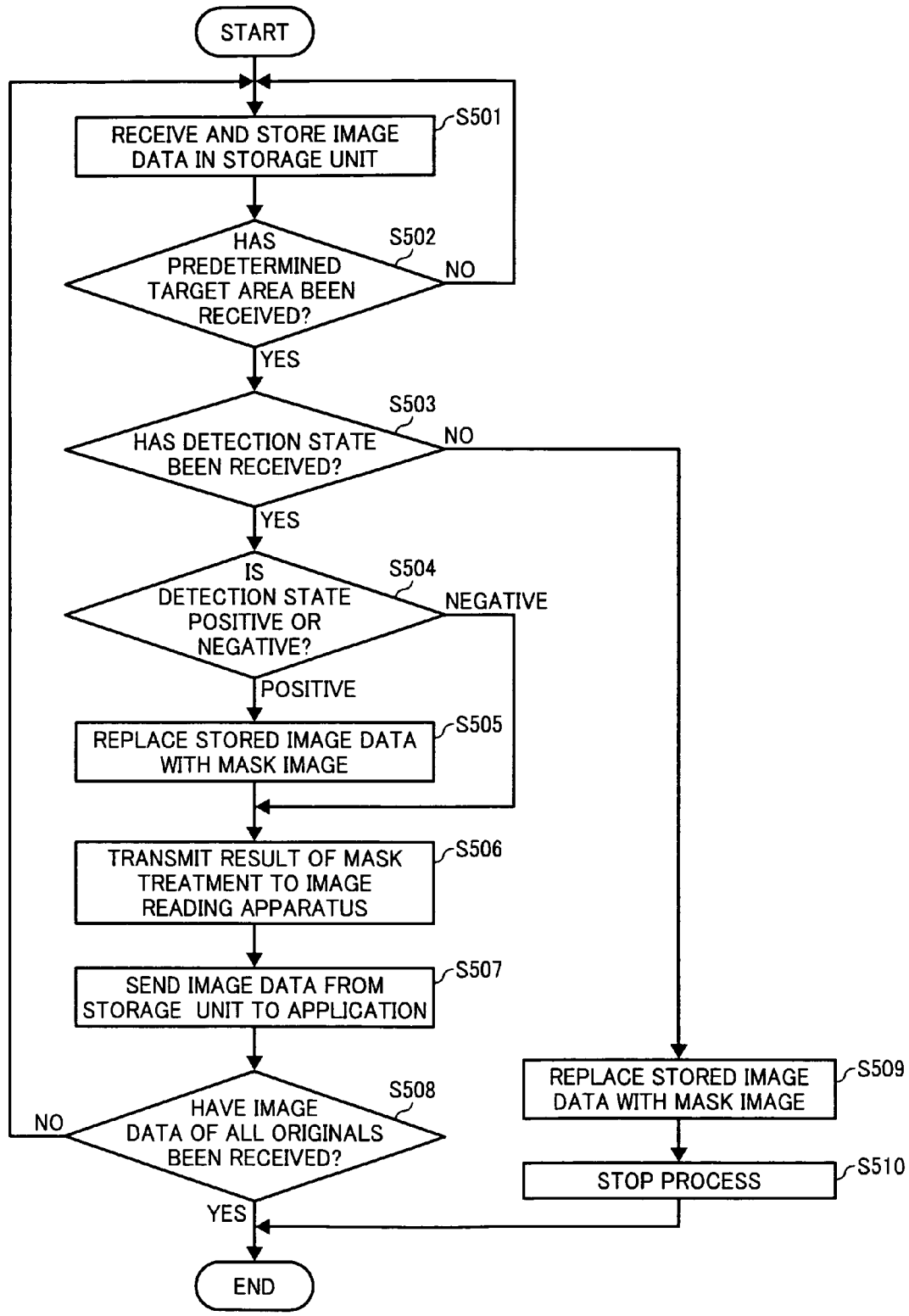
FIG. 5 is a flowchart of an image receiving process according to the first embodiment.

FIG. 5 is a flowchart of the image receiving process in which the PC 30 receives the image data and processes the received image data as appropriately. The image receiving process is, more particularly, performed by the scanner driver 31 and includes the steps indicated by (5) and (6) shown in FIG. 1.

Given below is an explanation about the image reading process with reference to FIG. 4.

Upon receiving the read command from the scanner driver 31, the copy-prohibited document detecting unit 13 sets a flag indicative whether the copy-prohibited document has been detected (hereinafter, "detection state") to negative (Step S401). The scanner control unit 11 causes the scanner unit 21 to start reading of the image data (Step S402). Although not shown in FIG. 4, the image processing unit 12 performs certain image processing, for example, corrects distortion of the image data obtained by the scanner unit 21.

The scanner control unit 11 determines whether the detection state is negative or positive (Step S403). When the detection state is negative (Negative at Step S403), the copy-prohibited document detecting unit 13 performs the copy-prohibited document detecting process to detect the copy-prohibited document from the obtained image data (Step S404).

When the copy-prohibited document is detected (Yes at Step S404), the copy-prohibited document detecting unit 13 sets the detection state to positive (Step S405). When the detection state is set to positive or when the detection state is positive at Step S403 (Positive at Step S403), the replacing unit 14 replaces the obtained image data with the mask image (Step S406). Thus, the after-detection data is transmitted in the masked state, which prevents illegal usage of the copy-prohibited image data.

When the image data is replaced with the mask image or when the copy-prohibited document is not detected at Step S404 (No at Step S404), the communication unit 15 transmits either the replaced image data or the obtained image data to the PC 30 (Step S407). The communication unit 15 transmits the image data sequentially. The image data is made up of a plurality of lines; and each piece is formed, for example, to include one line or predetermined number of lines.

The scanner control unit 11 determines whether the entire frame, i.e., the target area to be read has been read (Step S408).

When the predetermined target area has not been read, i.e., there is a remaining part of the frame to be read (No at Step S408), the scanner control unit 11 reads the next image data, and the process is repeated (Step S402).

When the predetermined target area has been read (Yes at Step S408), the communication unit 15 transmits the detection state to the PC 30 (Step S409). After that, the communication unit 15 receives from the PC 30 a result of mask treatment as a response to the detection state (Step S410). The result of mask treatment indicates whether the scanner driver 31 has finished the mask treatment (replacement of the image data with the mask image) normally depending on the result of detection. The result of mask treatment includes "normal end", "abnormal end", and "unexecuted". If the copy-prohibited document is not detected, the result of mask treatment indicative of unexecuted will be returned.

The scanner control unit 11 determines whether the mask treatment has finished normally from the result of mask treatment that is received from the communication unit 15 (Step S411). If the result of mask treatment is abnormal end or unexecuted in a situation that the detection state is positive, the scanner control unit 11 determines that the mask treatment has finished abnormally. If the communication unit 15 fails to receive the result of mask treatment, the scanner control unit 11 determines that the mask treatment has finished abnormally.

When determining that the mask treatment has finished abnormally (Abnormal at Step S411), the scanner control unit 11 performs the error process (Step S412), i.e., stops reading of the successive frames, or the like.

When determining that the mask treatment has finished normally (Normal at Step S411), the scanner control unit 11 determines whether all originals to be read have been read (Step S413). If the all originals have not been read (No at Step S413), the process control returns to Step S401, and the detection state is set to negative to read the next original. If the all originals have been read (Yes at Step S413), the process control goes to end.

Given below is an explanation about the image receiving process performed by the PC 30 with reference to FIG. 5.

The receiving unit 31*a* of the scanner driver 31 receives the image data from the image reading apparatus 10. The storing unit 31*b* stores the image data in the storage unit 42 (Step S501).

The receiving unit 31*a* determines whether the predetermined target area, i.e., the image data forming one frame has been received (Step S502). If the predetermined target area has not been received (No at Step S502), the process control returns to Step S501 to receive remaining image data.

If the predetermined target area has been received (Yes at Step S502), the receiving unit 31*a* determines whether the detection state has been received from the image reading apparatus 10 (Step S503).

If the detection state has been received normally (Yes at Step S503), the receiving unit 31*a* determines whether the detection state is positive or negative (Step S504).

If the detection state is positive (Positive at Step S504), the restricting unit 31*d* replaces the image data stored in the storage unit 42 with the mask image (Step S505). Thus, the before-detection data is replaced with the mask image, which prevents illegal usage of the copy-prohibited image.

If the detection state is negative (Negative at Step S504) or after the image data is replaced with the masked data in a situation that the detection state is positive, the scanner driver 31 transmits the result of mask treatment to the image reading apparatus 10 (Step S506). If the mask treatment has finished normally, i.e., the image data has been replaced with the mask image successfully, the result of mask treatment is set to normal end. If the mask treatment is not performed because of the detection state being negative, the result of mask treatment is set to unexecuted. After that, the scanner driver 31 sends the image data from the storage unit 42 to the application 32 (Step S507).

The scanner driver 31 sends the entire image data forming one frame at one time from the storage unit 42 to the application 32. As a result, if the copy-prohibited document is detected, the image data is displayed on the display unit 41 in a fully-masked state, and the malicious user cannot obtain the copy-prohibited image.

The scanner driver 31 determines whether image data of all originals to be read have been received (Step S508). If the image data of all originals have not been received (No at Step S508), the process control returns to Step S501 to receive image data obtained from the next original. If the image data of all originals have been received (Yes at Step S508), the process control goes to end.

On the other hand, when the receiving unit 31*a* determines that the detection state has not received normally (No at Step S503), the restricting unit 31*d* replaces the image data stored in the storage unit 42 with the mask image (Step S509). The scanner driver 31 stops the process (Step S510), and the process control goes to end. With this configuration, even if the malicious user who tries to obtain unmasked copy-prohibited image blocks the PC 30 so that the PC 30 cannot receive the detection state by cutting off communications between the image reading apparatus 10 and the PC 30, the malicious user cannot illegally obtain the unmasked copy-prohibited image. Alternatively, the image data stored in the storage unit 42 can be deleted instead of replaced with the mask image, when the copy-prohibited document is detected.

Figure 6:
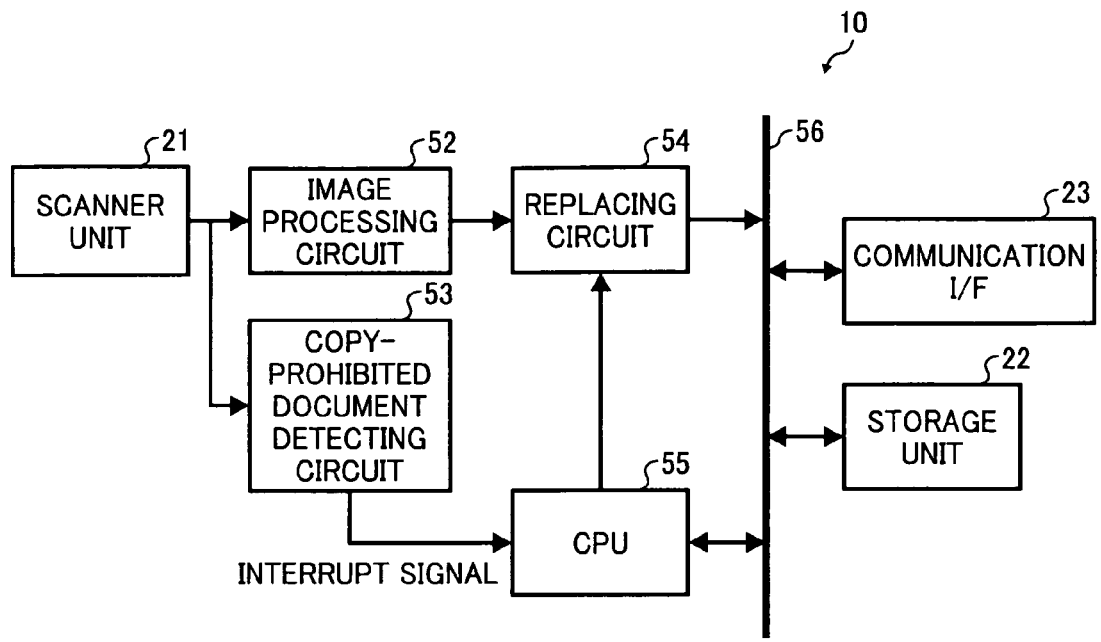
FIG. 6 is an example of the hardware structure of an image reading apparatus shown in FIG. 2.

Given below is an explanation about the hardware structures of the image reading apparatus 10 and the PC 30. FIG. 6 is an example of the hardware structure of the image reading apparatus 10. The image reading apparatus 10 includes an image processing circuit 52, a copy-prohibited document detecting circuit 53, a replacing circuit 54, a central processing unit (CPU) 55, and a data bus 56 in addition to the scanner unit 21, the storage unit 22, and the communication I/F 23.

The CPU 55 controls operations of the image reading apparatus 10. The data bus 56 connects between the CPU 55, the replacing circuit 54, the storage unit 22, and the communication I/F 23 for data transmission.

The image processing circuit 52, the copy-prohibited document detecting circuit 53, and the replacing circuit 54 work as the image processing unit 12, the copy-prohibited document detecting unit 13, and the replacing unit 14, respectively. Alternatively, the CPU 55 can work as any of the image processing unit 12, the copy-prohibited document detecting unit 13, and the replacing unit 14 as software.

Upon detecting the copy-prohibited document, the copy-prohibited document detecting circuit 53 generates an interrupt signal to transmit the result of detection to the CPU 55 of. In most cases, the copy-prohibited document detecting circuit 53 generates the interrupt signal in a course of scanning the problematic original.

Upon receiving the interrupt signal from the copy-prohibited document detecting circuit 53, the CPU 55 sends a replacement command to the replacing circuit 54. The replacing circuit 54 replaces, in response to the replacement command, the image data processed by the image processing circuit 52 with a predetermined value immediately as an enforcement measure. The replacing circuit 54 can be placed at another position instead of the position shown in FIG. 6. It is allowable to configure the image reading apparatus 10 to replace, after the copy-prohibited document detecting circuit 53 generates the interrupt signal, the image data stored in the storage unit 22 in response to the replace command from the CPU 55 by performing the image replacing process that brings an effect same as the replacing circuit 54 brings. In this manner, the image reading apparatus 10 prevents transmission of the copy-prohibited image data to the external device as much as possible.

Moreover, because the CPU 55 receives the interrupt signal indicative of the result of detection, it is possible for the CPU 55 to transmit the result of detection to the external device after the entire image data has been transmitted.

Figure 7:
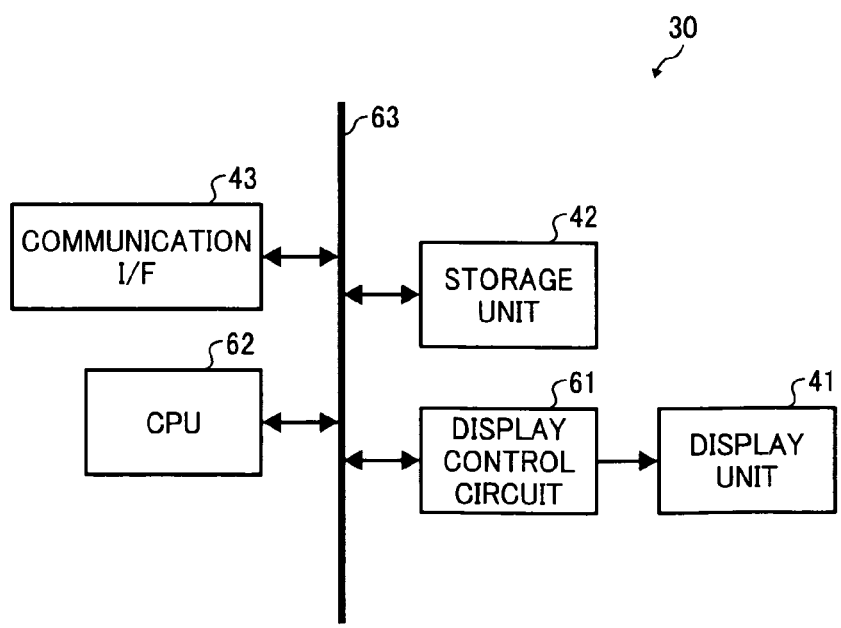
FIG. 7 is an example of the hardware structure of a PC shown in FIG. 2.

Given below is an explanation about the hardware structure of the PC 30. FIG. 7 is an example of the hardware structure of the PC 30. The PC 30 includes a display control circuit 61, a CPU 62, and a data bus 63 in addition to the display unit 41, the storage unit 42, and the communication I/F 43.

The display control circuit 61 works as the display control unit 33. The CPU 62 controls operations of the PC 30. The data bus 63 connects between the storage unit 42, the communication I/F 43, the display control circuit 61, and the CPU 62 for data transmission.

An image processing program according to the first embodiment is executed by the PC 30 to implement functions of the scanner driver 31. The image processing program can be stored, in a form of a file that is installable and executable on a computer, in a recording medium readable by the computer, such as a compact disk-read only memory (CD-ROM), a flexible disk (FD), a compact disk-recordable (CD-R), and a digital versatile disk (DVD).

On the other hand, the image processing program can be stored in another computer connected to the computer via a network such as the Internet, and downloaded to the computer via the network. The image processing program can be delivered or distributed via a network such as the Internet.

The image processing program can be delivered or distributed, for example, in a state preinstalled into a recording medium such as a read only memory (ROM).

The image processing program is, for example, made up of modules that implement the units of the scanner driver, such as the receiving unit, the storing unit, the determining unit, and the restricting unit as software. When the CPU (processor) reads the image processing program from the recording medium and executes the read image processing program, the above modules are loaded and created on a main memory thereby implementing the units of the scanner driver.

As described above, in the image processing system according to the first embodiment, the image reading apparatus sequentially transmits, while reading the image data, the obtained image data to the external device. The image reading apparatus also transmits the flag indicative of the result of detection to the external device. The external device receives the image data and the flag, and determines from the flag whether the mask treatment is to be performed. If the mask treatment is to be performed, the external device masks the received image data. Thus, when the copy-prohibited document is detected, before-detection data is masked to prevent illegal usage of the copy-prohibited image data.

Moreover, because the external device just receives the result of detection from the image reading apparatus without detecting the copy-prohibited document by itself, it is possible to perform the copy-prohibited document detecting process as hardware. To detect the copy-prohibited document by the external device, the scanner driver, which is software, has to perform the copy-prohibited document detecting process. If the image reading apparatus has an existing function such as copying that can work as the copy-prohibited document detecting function, it is possible to implement the first embodiment using the existing function. Furthermore, the copy-prohibited image is detected by the image reading apparatus that is upstream of the external device, which reduces possibility that the malicious user illegally obtains the copy-prohibited image data. Even if, for example, the malicious user replaces the scanner driver, the malicious user cannot illegally obtain the copy-prohibited image.

Although the image reading apparatus 10 detects the copy-prohibited document in the first embodiment, the scanner driver 31 instead is used to detect the copy-prohibited document in the image data received from the image reading apparatus 10. Even if the copy-prohibited document detecting process is performed by the scanner driver 31, when the copy-prohibited document is detected, the before-detection data is masked. Thus, it is possible to prevent illegal usage of the copy-prohibited image.

Moreover, the PC 30 in the first embodiment receives the detection state from the image reading apparatus 10, and determines whether the copy-prohibited document has been detected from the received detection state. However, the PC that determines whether the original includes the copy-prohibited document by analyzing the received image data can be used as the PC 30.

When the copy-prohibited document is detected, the image data is replaced with the mask image such as the white image as described above. In other words, it is possible to determine whether the original includes the copy-prohibited document by comparing the received image data with a pattern of the mask image. The PC determines whether the received image data matches with the pattern of the mask image when, for example, the number of lines included in the received image data reaches a value enough for performing the comparison.

Furthermore, the image reading apparatus 10 can transmit the detection state to the PC 30 when the copy-prohibited document is detected at Step S404 instead of when the entire image data has read. If the image reading apparatus 10 transmits the detection state to the PC 30 when the copy-prohibited document is detected at Step S404, the scanner driver 31 can replace the stored image data with the mask image at earlier timing, which is effective for preventing illegal usage of the copy-prohibited image.

The after-detection data is transmitted in the masked state from the image reading apparatus 10 to the PC 30. Therefore, it is unnecessary to replace the after-detection data with the mask image using the scanner driver 31. If the scanner driver 31 masks the before-detection data only, a processing burden on the scanner driver 31 is reduced.

In an image processing apparatus according to a second embodiment according to the present invention, an image reading apparatus converts the obtained image data based on a predetermined rule into unreadable converted data, and sequentially transmits the converted data to an external device. If the image data does not include the copy-prohibited document, the external device converts the converted data to the original image data, and sends the original image data to the application.

Figure 8:
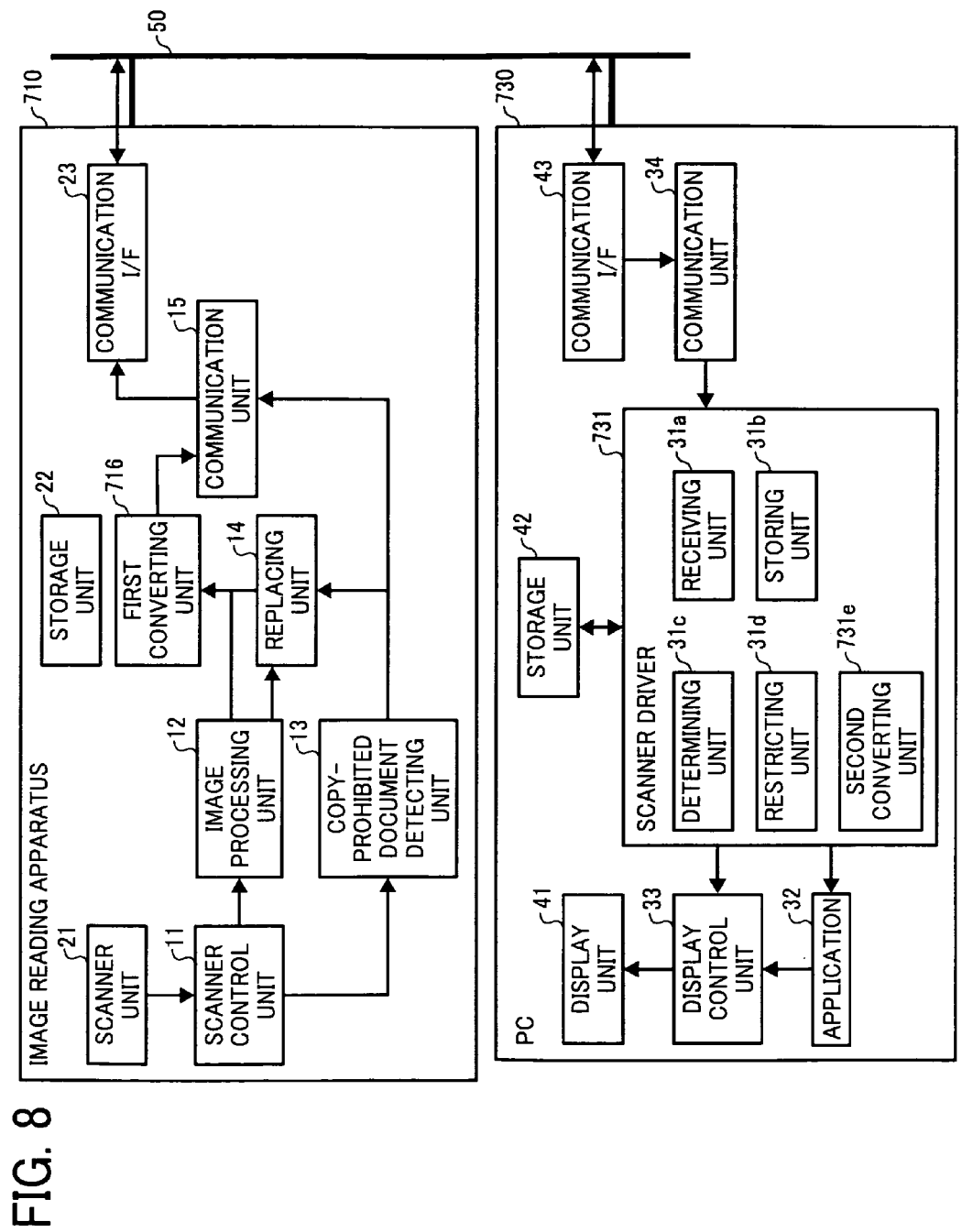
FIG. 8 is a block diagram of an image processing system according to a second embodiment of the present invention.

FIG. 8 is a block diagram of the image processing system according to the second embodiment. The image processing system includes an image reading apparatus 710 and a PC 730 connected to each other via the network 50.

The image reading apparatus 710 includes the scanner unit 21, the storage unit 22, and the communication I/F 23 as hardware. The image reading apparatus 710 includes the scanner control unit 11, the image processing unit 12, the copy-prohibited document detecting unit 13, the replacing unit 14, the communication unit 15, and a first converting unit 716 as software.

The image reading apparatus 710 has the same structure as the image reading apparatus 10 according to the first embodiment except for the first converting unit 716. The units of the image reading apparatus 710 same as those of the image reading apparatus 10 shown in FIG. 2 are denoted with the same reference numerals; and explanations about the same units are not repeated.

The first converting unit 716 converts the obtained image data into unreadable converted data based on a predetermined conversion rule. It is allowable to use any generally-used conversion rules such as shuffling order of lines forming the image data or performing re-convertible mask treatment.

The PC 730 is described in detail below. As shown in FIG. 8, the PC 730 includes the display unit 41, the storage unit 42, and the communication I/F 43 as hardware. The PC 730 includes a scanner driver 731, the application 32, the display control unit 33, and the communication unit 34 as software.

The PC 730 has the same structure as the PC 30 according to the first embodiment except for a second converting unit 731e of the scanner driver 731. The units of the PC 730 same as those of the PC 30 shown in FIG. 2 are denoted with the same reference numerals; and explanations about the same units are not repeated.

The second converting unit 731e converts, based on the conversion rule that has been used by the first converting unit 716, the converted data into the original image data.

Figure 9:
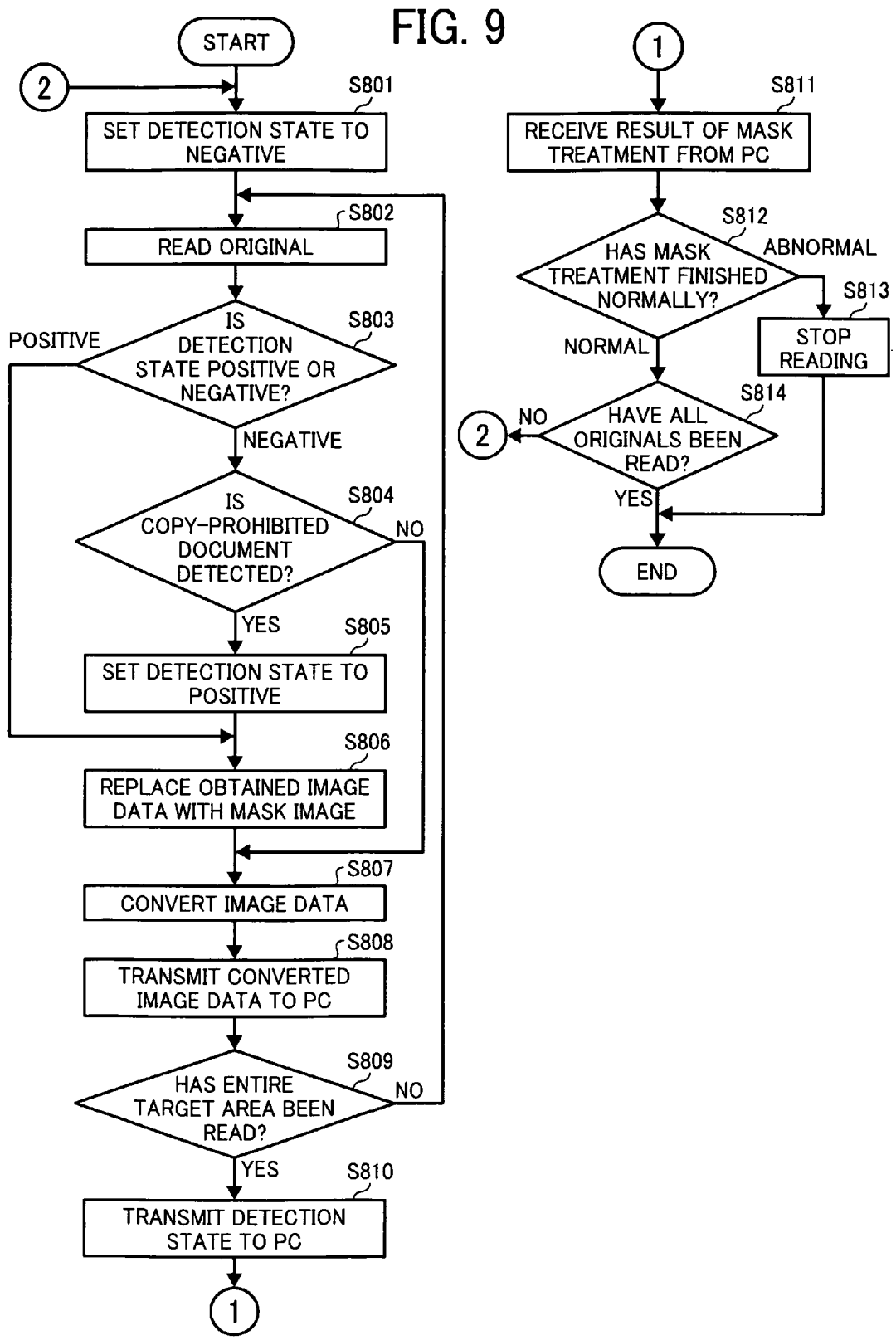
FIG. 9 is a flowchart of an image reading process according to the second embodiment.
Figure 10:
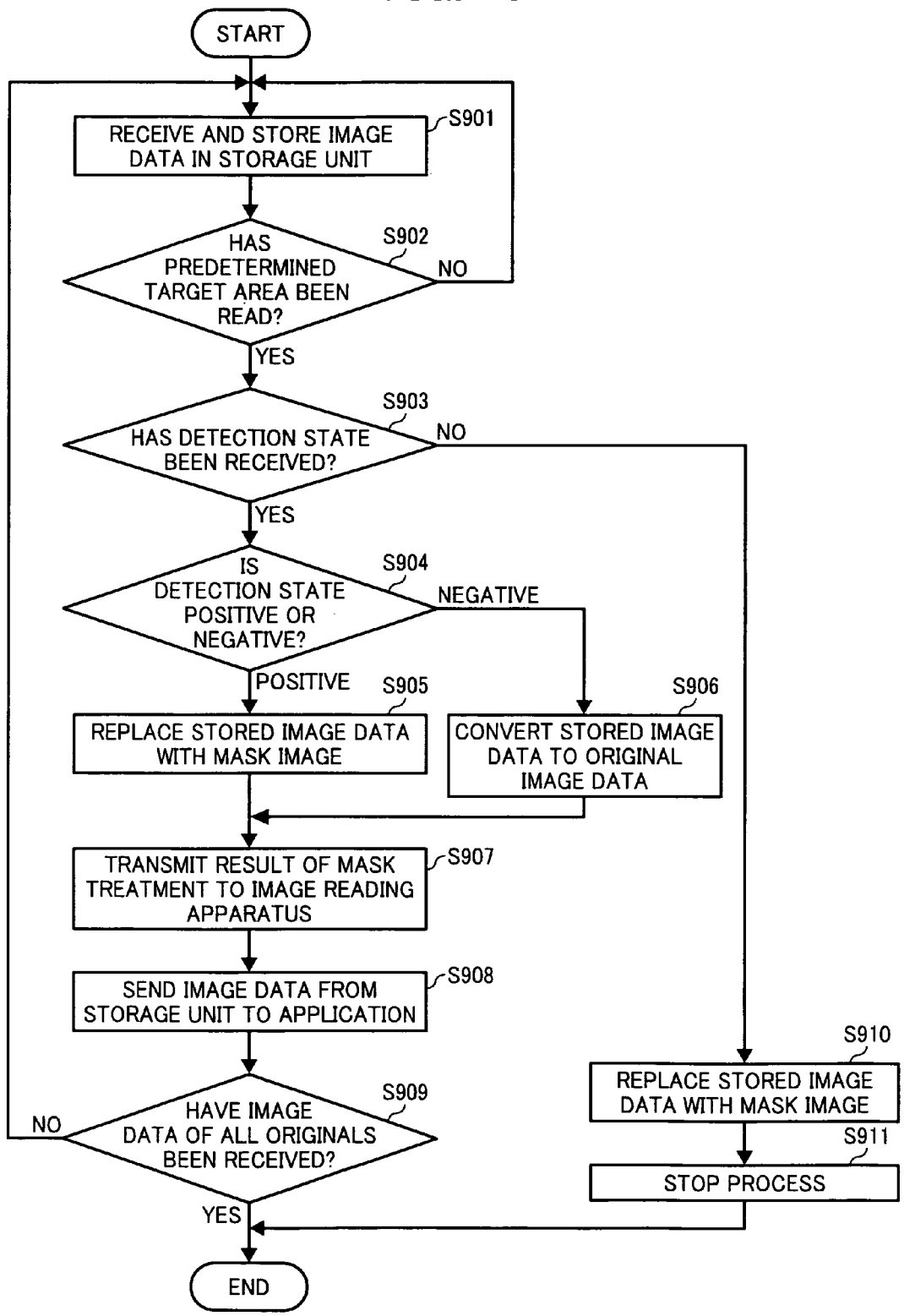
FIG. 10 is a flowchart of an image receiving process according to the second embodiment.

Given below is an explanation about an image processing process performed by the image processing system according to the second embodiment with reference to FIGS. 9 and 10. FIG. 9 is a flowchart of an image reading process according to the second embodiment; and FIG. 10 a flowchart of an image receiving process according to the second embodiment.

The image reading process is described below with reference to FIG. 9. The image-data reading step, the copy-prohibited document detecting step, and the image-data replacing step from Step S801 to Step S806 are similar to those from Step S401 to Step S406 in the first embodiment; and explanations about Step S801 to Step S806 are omitted.

After the image data is replaced (Step S806) or when the copy-prohibited document is not detected at Step S804 (No at Step S804), the first converting unit 716 converts the obtained image data based on the conversion rule (Step S807).

The transmitting step and the determining step from Step S808 to Step S814 are similar to those from Step S407 to Step S413 in the first embodiment; and explanations about Step S808 to Step S814 are omitted.

The image receiving process is described below with reference to FIG. 10. The image-data storing step, the detection-state receiving step, and the determining step from Step S901 to Step S904 are similar to those from Step S501 to Step S504 in the first embodiment; and explanations about Step S901 to Step S904 are omitted.

When the receiving unit 31a determines that the detection state is positive at Step S904 (Positive at Step S904), the restricting unit 31d replaces the image data stored in the storage unit 42 with the mask image (Step S905).

When the detection state is negative (Negative at Step S904), the second converting unit 731e converts the image data stored in the storage unit 42 to the original image data based on the conversion rule (Step S906).

The image-data sending step, the determining step, and the error-process step from Step S907 to Step S911 are similar to those from Step S506 to Step S510 in the first embodiment; and explanations about Step S907 to Step S911 are omitted.

In this manner, in the image processing system according to the second embodiment, the image reading apparatus converts the obtained image data based on the conversion rule into the unreadable converted data, and sequentially transmits the converted data to the external device. If the image data does not include the copy-prohibited document, the external device converts the converted data to the original image data, and sends the original image data to the application. If, for example, the malicious user acquires the image data from the storage unit, the acquired image data is unreadable. Thus, the image processing system prevents illegal usage of the copy-prohibited image.

An image processing apparatus according to a third embodiment according to the present invention stops, when the image data includes the copy-prohibited document, sending of the image data to the application instead of replacing the image data with the mask image.

Figure 11:
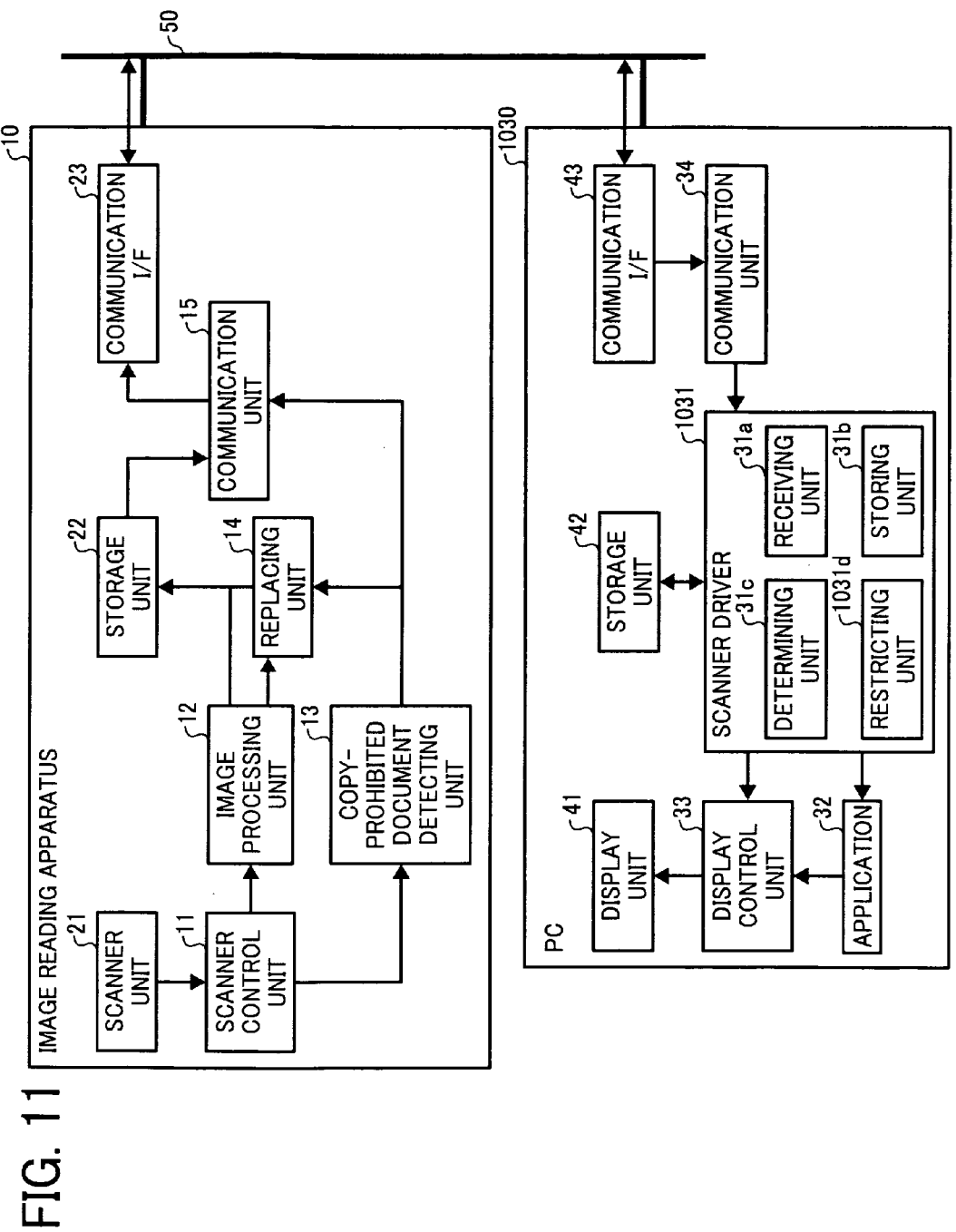
FIG. 11 is a block diagram of an image processing system according to a third embodiment of the present invention.

FIG. 11 is a block diagram of the image processing system according to the third embodiment. The image processing system includes the image reading apparatus 10 and a PC 1030 connected to each other via the network 50.

The image reading apparatus according to the third embodiment has the same structure as the image reading apparatus 10 according to the first embodiment. Therefore, the image reading apparatus is denoted with the same reference numeral; and the explanation about the image reading apparatus 10 is not repeated.

The PC 1030 includes the display unit 41, the storage unit 42, and the communication I/F 43 as hardware. The PC 1030 includes a scanner driver 1031, the application 32, and the communication unit 34 as software.

The PC 1030 has the same structure as the PC 30 according to the first embodiment except for a restricting unit 1031d in the scanner driver 1031. The units of the PC 1030 same as those of the PC 30 shown in FIG. 2 are denoted with the same reference numerals; and explanations about the same units are not repeated.

When the determining unit 31c determines that the original includes the copy-prohibited document, the restricting unit 1031d stops sending of the image data of the original to the application 32. If the scanner driver 1031 has a function of causing the display control unit 33 to display the image data on the display unit 41, the restricting unit 1031d stops the scanner driver 1031 so that the image data is not displayed on the display unit 41.

Figure 12:
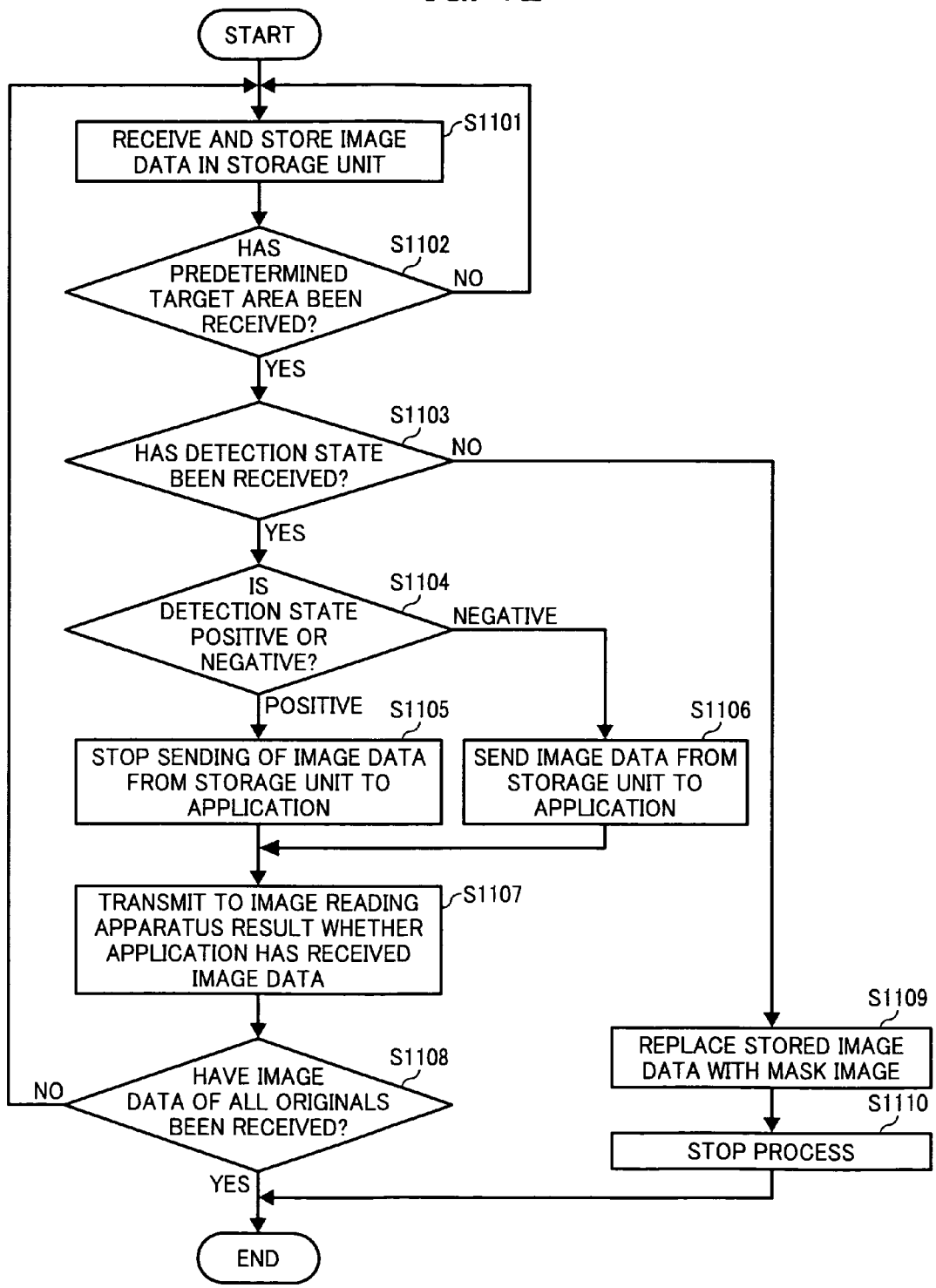
FIG. 12 is a flowchart of an image receiving process according to the third embodiment.

Given below is an explanation about an image processing process by the image processing system according to the third embodiment with reference to FIG. 12. FIG. 12 is a flowchart of an image receiving process according to the third embodiment. An image reading process according to the third embodiment is similar to the image reading process according to the first embodiment shown in FIG. 4; and the explanation is omitted.

The image-data storing step, the detection-state receiving step, and the determining step from Step S101 to Step S1104 are similar to those from Step S501 to Step S504 in the first embodiment; and explanations about Step S1101 to Step S1104 are omitted.

When the receiving unit 31a determines that the detection state is positive at Step S1104 (Positive at Step S1104), the restricting unit 1031d stops sending of the image data from the storage unit 42 to the application 32 (Step S1105). If the scanner driver 1031 has the function of displaying the image data, the restricting unit 1031d stops the scanner driver 1031 so that the image data is not displayed.

When the detection state is negative (Negative at Step S1104), the scanner driver 1031 sends the image data from the storage unit 42 to the application 32 (Step S1106).

The determining step and the error-process step from Step S1108 to Step S1110 are similar to those from Step S508 to Step S510 in the first embodiment; and explanations about Step S1108 to Step S1110 are omitted. The PC 1030 transmits a result whether the application 32 has received the image data to the image reading apparatus 10 (Step S1007) instead of the result of mask treatment.

The restricting unit 1031d can replace the image data stored in the storage unit 42 with the mask image in the similar manner as in the first embodiment, without just stopping sending of the image data to the application 32. With this configuration, no copy-prohibited image is stored in the PC 1030 in the unmasked state, which prevents illegal usage of the copy-prohibited image data more effectively.

In this manner, when the image data includes the copy-prohibited document, the image processing apparatus according to the third embodiment stops sending of the image data from the scanner driver to the application or the like. Thus, the image data that the PC has already received before detection of the copy-prohibited document is masked so that the malicious user cannot illegally use the copy-prohibited image data.

As described above, according to an aspect of the present invention, it is possible to prevent illegal usage of the copy-prohibited image even if the image data is transmitted sequentially.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing system, comprising:
an image reading apparatus that reads an original and outputs image data of the original; and
an image processing apparatus that is connected to the image reading apparatus, and processes image data input from the image reading apparatus, wherein
the image reading apparatus includes:
a scanner unit that scans the original and generates the image data,
a first transmitting unit that sequentially transmits the image data generated by the scanner unit while the scanner unit scans the original,
a detecting unit that detects a predetermined particular image from the image data, and
a second transmitting unit that transmits a detection result of detecting the particular image, and
the image processing apparatus includes:
a receiving unit that receives the image data and the detection result from the image reading apparatus,
a storing unit that stores the image data received by the receiving unit in a first storage unit,
a determining unit that determines whether the detection result is received,
a restricting unit that restricts, when the determining unit determines that the detection result is received, usage of the image data stored in the first storage unit, and
a third transmitting unit that receives a read command for reading the original from an application that is used for processing the image data, and transmits the read command to the image reading apparatus,
wherein the scanner unit scans the original in response to the read command, and
when the determining unit determines that the detection result is received, the restricting unit stops sending the image data from the first storage unit to the application.

2. The image processing system according to claim 1, wherein
the image reading apparatus further includes a replacing unit that replaces, when the detecting unit detects the particular image, image data that is generated after detecting the particular image with the mask image, and
when the detecting unit detects the particular image, the first transmitting unit sequentially transmits the mask image to the image processing apparatus.

3. The image processing system according to claim 1, wherein the second transmitting unit transmits the detection result to the image processing apparatus when the scanner unit finishes scanning of the original.

4. The image processing system according to claim 1, wherein the second transmitting unit transmits the detection result to the image processing apparatus while the scanner unit scans the original.

5. The image processing system according to claim 1, wherein
the image reading apparatus further includes a second storage unit that stores therein the image data generated by the scanning unit, and
when a size of the image data stored in the second storage unit reaches a set value, the first transmitting unit transmits the image data stored in the second storage unit to the image processing apparatus.

6. The image processing system according to claim 1, wherein when the determining unit determines that the detection result is received, the restricting unit replaces the image data stored in the first storage unit with the mask image.

7. The image processing system according to claim 1, wherein when the determining unit determines that the detection result is not received, the restricting unit restricts usage of the image data stored in the first storage unit.

8. The image processing system according to claim 7, wherein when the determining unit determines that the detection result is not received, the restricting unit replaces the image data stored in the first storage unit with the mask image.

9. The image processing system according to claim 7, wherein when the determining unit determines that the detection result is not received, the restricting unit deletes the image data stored in the first storage unit.

10. The image processing system according to claim 1, wherein the detecting unit of the image reading apparatus extracts the particular image from the image data, and compares the extracted particular image with set image patterns of a particular image.

11. The image processing system according to claim 10, wherein when a degree of similarity between the extracted particular image and the set image patterns of the particular image is higher than a threshold, the detecting unit determines that the image data represents a copy-prohibited document.

12. The image processing system according to claim 1, further comprising a scanner control unit to receive the detection result and determine whether the mask imaging process has finished normally.

13. The image processing system according to claim 12, wherein when the scanner control unit determines that the mask imaging process has finished normally, the scanner control unit finishes the image reading process.

14. The image processing system according to claim 12, wherein when the scanner control unit determines that the mask imaging process has finished abnormally, the scanner control unit controls the scanner unit to stop reading the original.

15. The image processing system according to claim 1, wherein the determining unit determines whether the receiving unit has received or has not received the detection result normally.

16. The image processing system according to claim 15, wherein when the receiving unit has received the detection result normally, the determining unit further determines whether the particular image has been detected from the detection result.

17. The image processing system according to claim 15, wherein when the receiving unit has not received the detection result normally, the restricting unit restricts usage of the received image data.

18. An image reading apparatus that reads an original and outputs image data of the original, the image reading apparatus being configured to be connected to an image processing apparatus that processes image data input from the image reading apparatus, the image reading apparatus comprising:
 a scanner unit that scans the original and generates the image data;
 a first transmitting unit that sequentially transmits the image data generated by the scanner unit while the scanner unit scans the original;
 a detecting unit that detects a particular image from the image data;
 a second transmitting unit that transmits a detection result of detecting the particular image; and
 a third transmitting unit that receives a read command for reading the original from an application that is used for processing the image data, and transmits the read command to the image reading apparatus,
 wherein the scanner unit scans the original in response to the read command, and
 when a determining unit determines that the detection result is received, a restricting unit stops sending the image data from a storage unit to the application.

19. An image processing apparatus that is configured to be connected to an image reading apparatus that reads an original and outputs image data of the original, the image processing apparatus processing image data input from the image reading apparatus, the image processing apparatus comprising:
 a receiving unit that receives the image data and a detection result of detecting a particular image in the image data from the image reading apparatus;
 a storing unit that stores the image data received by the receiving unit in a storage unit;
 a determining unit that determines whether the detection result is received;
 a restricting unit that restricts, when the determining unit determines that the detection result is received, usage of the image data stored in the storage unit, and
 a transmitting unit that receives a read command for reading the original from an application that is used for processing the image data, and transmits the read command to the image reading apparatus,
 wherein the image reading apparatus scans the original in response to the read command, and
 when the determining unit determines that the detection result is received, the restricting unit stops sending the image data from the storage unit to the application.

* * * * *